(12) United States Patent
Turner et al.

(10) Patent No.: US 6,682,025 B2
(45) Date of Patent: Jan. 27, 2004

(54) PIPE SUPPORT

(75) Inventors: Thomas M. Turner, 1637 Ridgewood Ct., Twinsburg, OH (US) 44087; Timothy A. Grace, Chardon, OH (US)

(73) Assignee: Thomas M. Turner, Twinsburg, OH (US)

( * ) Notice: Subject to any disclaimer, the term of this patent is extended or adjusted under 35 U.S.C. 154(b) by 0 days.

(21) Appl. No.: 10/036,158

(22) Filed: Dec. 26, 2001

(65) Prior Publication Data

US 2003/0116683 A1 Jun. 26, 2003

(51) Int. Cl.[7] .................................................. F16L 3/08
(52) U.S. Cl. ............................................ 248/65; 248/49
(58) Field of Search ....................... 248/49, 62, 74.1, 248/74.2, 65

(56) References Cited

U.S. PATENT DOCUMENTS

| | | | | |
|---|---|---|---|---|
| 3,105,423 A | * | 10/1963 | Reiland ........................ 52/677 |
| 3,370,815 A | * | 2/1968 | Opperthauser ............... 248/74 |
| 3,471,987 A | * | 10/1969 | Yelsma ......................... 52/684 |
| 3,807,675 A | * | 4/1974 | Seckerson et al. ............ 24/337 |
| 3,894,706 A | * | 7/1975 | Mizusawa ................ 248/68.1 |
| 4,119,285 A | * | 10/1978 | Bisping et al. ........ 248/222.12 |
| 4,903,629 A | * | 2/1990 | Maudlin et al. ............. 114/361 |
| 4,934,635 A | * | 6/1990 | Sherman ....................... 24/279 |
| 4,997,148 A | * | 3/1991 | Sherman ....................... 24/279 |
| 5,040,753 A | * | 8/1991 | Roth .......................... 24/20 R |
| 5,251,857 A | * | 10/1993 | Grice et al. .................. 248/343 |
| 5,277,387 A | * | 1/1994 | Lewis et al. ................... 24/482 |
| 5,414,911 A | * | 5/1995 | Adams ......................... 24/545 |
| 5,572,776 A | * | 11/1996 | Murphy et al. ................ 24/487 |
| 5,871,306 A | * | 2/1999 | Tilcox .......................... 248/49 |
| 6,216,987 B1 | * | 4/2001 | Fukuo ................... 248/229.16 |
| 6,520,456 B1 | * | 2/2003 | Neider et al. .................. 248/49 |

* cited by examiner

Primary Examiner—Leslie A. Braun
Assistant Examiner—Kofi Schulterbrandt
(74) Attorney, Agent, or Firm—Pearne & Gordon LLP

(57) ABSTRACT

A pipe support for supporting gas lines and the like on a roof comprising a generally unitary member formed from a rubber-like material resistant to water and sunlight, the support including a triangular body formed by a base, converging legs and a connecting portion at the apex of the body, and clamping arms that extend from the connecting portion to form a pipe receiving and supporting chambers into which a pipe can be engaged by pressing the legs together to spread the arms apart, the pipe being clamped in the chamber by releasing the legs so that the arms close on the pipe.

4 Claims, 1 Drawing Sheet

PIPE SUPPORT

BACKGROUND OF THE INVENTION

The present invention relates generally to pipe supports, and, more specifically, to a new pipe support especially useful for supporting pipes, such as gas lines, on building roofs.

The current practice of securing a gas line or other pipe to a roof is to use supporting blocks of treated wood or redwood which are placed six feet or less apart along the pipe and at all turns and junctions. The pipe is secured to the wood blocks by galvanized strips.

The current practice has several disadvantages. The wood blocks deteriorate after time because of exposure to water and sunlight. This causes the supporting system to be unstable and requires the blocks to be replaced. Another disadvantage is that the galvanized strips do not allow for expansion and contraction of the pipe. This can also lead to an unstable support.

The installation and repair of the prior art system, including placement of the wood blocks and fastening of the galvanized straps around the pipe and to the blocks, is cumbersome and time consuming. For all of these reasons, there has been a need for a better system of pipe securement to roofs and the like.

SUMMARY OF THE INVENTION

An object of the present invention is to provide a better system of securing pipes to roofs which features a new and improved pipe support that overcomes the disadvantages of the prior art. In a preferred embodiment, the new pipe support is a unitary member formed of a flexible, rubber-like material comprising a triangular body formed by a base, converging support legs and a connecting wall at the apex of the triangular body. Clamping arms extend from the connecting wall to form a pipe receiving and supporting chamber above the triangular body.

The converging support legs act as levers that can be pressed together to open the arms whereby a pipe can be engaged in the pipe receiving and supporting chamber. When the legs are released, the support body returns to its normal triangular shape and the arms close on the pipe to clamp it in the chamber.

During service, the weight of the pipe keeps the support legs in their spread position and maintains the clamping arms against the pipe so that it is secured within the chamber.

The rubber-like material of the support, will not deteriorate from water or sunlight exposure, and thus provides for a more durable and lasting supporting system than can be achieved with the wood blocks and galvanized straps of the prior art. The wide platform base of the triangular support body provides stable and balanced support during service. At the same time, the clamping arms of the pipe chamber allow for expansion and contraction of the supported pipe and permits the support to be used with pipes of different sizes.

In the preferred form of the invention, the base, converging sides and connecting wall define a through passageway extending lengthwise of the base. This allows water to channel through the base so that the water cannot build up around the pipe and support system.

Other advantages and a fuller understanding of the invention will be had from the following detailed description of a preferred embodiment and the accompanying drawing.

DESCRIPTION OF PREFERRED EMBODIMENT

Figure 1:
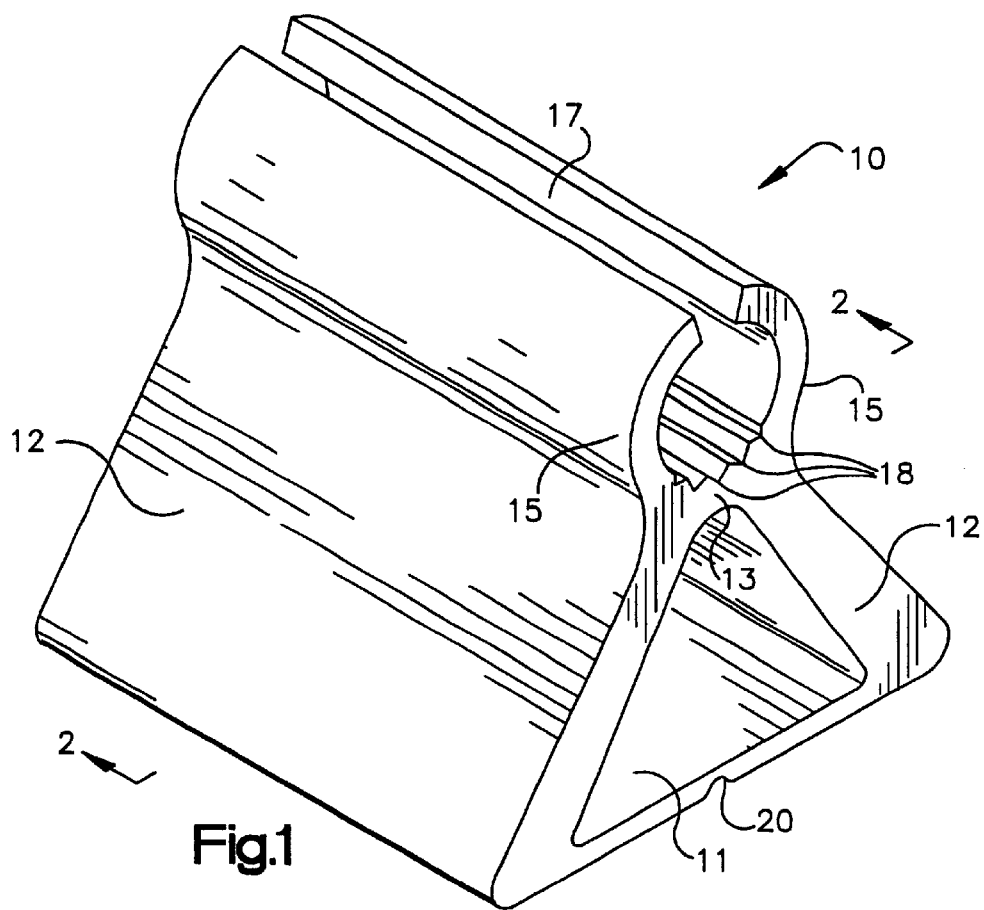
FIG. 1 is a perspective view of the new support.
Figure 2:
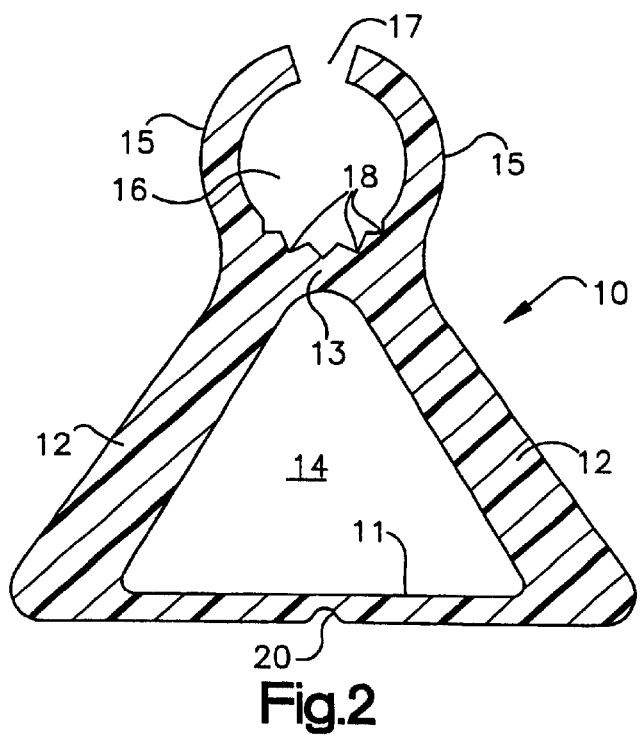
FIG. 2 is a vertical cross sectional view taken along the line 2—2 of FIG. 1.

Referring now to the drawing, the new pipe support of the invention is generally designated by reference numeral 10. It is a unitary member formed of a flexible, rubber-like material, such as an elastomer resistant to exposure to water and sunlight. As shown, the unitary pipe support 10 includes a platform base 11, converging, flexible legs 12 extending away from the base 11 and a connecting wall 13 between the sides 12. The base 11, legs 12 and the connecting wall 13 form a triangular support body having a triangular passageway 14 extending lengthwise through the support 10. The passageway 14 channels water through the support to prevent the water from accumulating around the pipe and support system.

The unitary support 10 further include flexible clamping arms 15 that extend from the connecting wall 13 to form the sides of a pipe receiving and supporting chamber 16. The distal ends of the arms 15 that are spaced apart to provide a gap 17. The arms 15 can be spread apart by deflecting the legs 12 toward each other to permit a pipe (not shown) to be introduced through the gap 17 and captured in the chamber 16. The flexibility of the arms 15 and the manner in which they are spread apart permit the support 10 to be used with pipes of different diameters. As shown, the arms 15 are curved outwardly of the legs 12 so as to conform with the outside of a pipe. Also, as shown, the connecting wall 13 has longitudinally extending, pipe engaging serrations 18 that act to stabilize the pipe within the chamber 16 and drain water through the chamber to prevent its accumulation.

The platform base 11 has a groove or slot 20 that extends longitudinally of the support 10 midway between the legs 12. The groove or slot 20 forms a hinge point that permits the base 11 to flex inwardly of the triangular body when the legs 12 are pressed together to open the arms 15.

When engaging the support 10 with a pipe, the legs 12 are pressed together. As described above, the deflection of the legs 12 opens the arms 15 while the base 11 folds inwardly about the hinge point 20. The opening action of the arms 15 allows the support 10 to be slipped over a pipe. When the legs 12 are released, the elastic memory of the rubber material returns the base 11 to its normal., illustrated position and closes the arms 15 around the pipe to clamp it in the chamber 16. If desired, the distal ends of the arms 15 can be formed with upstanding ears or tabs which are connected together by one or more screws to insure closure of the chamber 16 after a pipe has been inserted.

The triangular body shape formed the base 11 and the converging legs 12 create a stable and balanced support. In addition to achieving enhanced stability by reason of the triangular shape, the weight of the pipe engaged by the support causes the legs 12 to maintain a spread position which effectively secures the pipe in the chamber 16.

It will be apparent from the foregoing that the construction of the new pipe support overcomes the several disadvantages of prior art practice by providing a construction which resists deterioration due to exposure to water and sunlight, is stable, and allows for pipe expansion and contraction without effecting stability and balance. The new support accommodates pipes of different diameters and can be easily and quickly installed without tooling.

It is to be understood that, within the scope of the appended claims, the invention can be practiced otherwise than as specifically shown and described.

What is claimed is:

1. A pipe support made of a rubber material comprising:
a) a hollow triangular body having a base, converging legs and a connecting portion at the apex of said body, and
b) flexible arms extending from the apex of said body to form a pipe chamber above said body:
c) said flexible arms having distal ends which can be spread apart whereby said arms pivot about said apex of said body to permit a pipe to be engaged in said chamber, and
d) said converging legs forming straight side walls for said hollow triangular body in order to support the weight of a pipe engaged in said chamber above said base when said base is horizontally disposed.

2. A pipe support made of a flexible, rubber material comprising:
a) a hollow triangular support body having a base, converging legs and a connecting potion at the apex of said body;
b) clamping arms extending from said connecting portion to form a pipe chamber above said support body, and
c) said converging legs being flexible and acting as levers that can be pressed together inwardly of said hollow body to open said arms, whereby a pipe can be engaged in said chamber, said arms thereafter closing on the pipe to clamp it in said chamber when said legs are released and said body returns to its triangular shape, and
d) whereby said arms and said flexible legs pivot about said apex of said body.

3. A pipe support made of a flexible material comprising:
a) a hollow triangular body having a base, converging legs, and a connecting portion at the apex of said triangular hollow body, said base having a reduced thickness portion extending longitudinally of said support between said legs to form a hinge point that permits said base to be folded inwardly of said body;
b) clamping arms extending from said connecting portion and forming therewith a pipe receiving and support chamber, and c) said leg being flexible and acting as levers that can be pressed together to open said arms while folding said base, whereby a pipe can be engaged in said chamber, said arms thereafter closing on the pipe to clamp it in said chamber when said legs are released and said body returns to its triangular shape, and
d) whereby said arms and said flexible legs pivot about said apex of said body.

4. A pipe support made of a flexible, rubber material comprising:
a) a triangular body having a base, flexible legs and a connecting portion at the apex of said body, end b) flexible arms extending from the apex of said body to form a pipe chamber above said body;
c) said flexible arms having distal ends which can be spread apart by pressing said legs together to permit a pipe to be engaged in said chamber; and
d) said base has a hinge portion that permits said base to fold inwardly of said hollow body, while said legs are pressed together to open said arms whereby said grins and said flexible legs pivot about said apex of said body.

* * * * *

UNITED STATES PATENT AND TRADEMARK OFFICE
CERTIFICATE OF CORRECTION

PATENT NO. : 6,682,025 B2
DATED : January 27, 2004
INVENTOR(S) : Thomas M. Turner et al.

It is certified that error appears in the above-identified patent and that said Letters Patent is hereby corrected as shown below:

Column 4,
Lines 20-32, please insert claims 6 and 7 as renumbered claims 4 and 5 as identified below.

4. A pipe support as claimed in claim 3 wherein said body forams a water channel extending longitudinally of said support.

5. A pipe support as claimed in claim 4 wherein said arms are bowed outwardly of said legs to form curved sides of said chamber.

Column 4,
Line 20, claim 4 should be renumbered as claim 6.
Line 22, "end" should be -- and --.
Line 30, "grins" should be -- arms --.

Signed and Sealed this

Twenty-eighth Day of June, 2005

JON W. DUDAS
*Director of the United States Patent and Trademark Office*